US006288382B1

(12) United States Patent
Ishihara (10) Patent No.: US 6,288,382 B1
(45) Date of Patent: Sep. 11, 2001

(54) MICRO-SCANNING MULTISLIT CONFOCAL IMAGE ACQUISITION APPARATUS

(75) Inventor: Mitsuhiro Ishihara, Aichi-ken (JP)

(73) Assignee: Takaoka Electric Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/418,308

(22) Filed: Oct. 14, 1999

(30) Foreign Application Priority Data

Dec. 17, 1998 (JP) .................................................. 10-358493

(51) Int. Cl.[7] .......................................................... G01J 3/28
(52) U.S. Cl. ........................................ 250/201.3; 356/310
(58) Field of Search ................................. 250/201.3, 216; 355/53, 56; 356/2, 601, 310, 330

(56) References Cited

U.S. PATENT DOCUMENTS 6,108,090 * 8/2000 Ishihara ................................. 356/601
6,128,077 * 10/2000 Jovin et al. ........................... 356/310

OTHER PUBLICATIONS

Patent Abstract of Japan, Publication No. 09257440, Oct. 3, 1997, Application No. 0809682, Mar. 26, 1996, Inventor: Mitsuhiro Ishihara.

Patent Abstract of Japan, Publication No. 10239036, Nov. 9, 1998, Application No. 09055485, Feb. 25, 1997, Inventor: Mitsuhiro Ishihara.

* cited by examiner

Primary Examiner—Stephone B. Allen
(74) Attorney, Agent, or Firm—Kanesaka & Takeuchi (57) ABSTRACT

The micro-scanning multislit confocal image acquisition apparatus of the present invention is a confocal image acquisition apparatus that comprises a nonscanning multislit confocal image acquisition system using a slit array instead of a pinhole array and a multislit-image microscanning mechanism for moving the image of the slit array in a small back and forth motion with respect to the object during each exposure of the two-dimensional arrayed photodetector in one complete measurement. Microscanning the image of the slit array with an amplitude equal to half the distance between adjacent slits increase the aperture ratio of the pixels to 100 percent, reducing blind regions to zero. As a result, this apparatus can measure a small object that cannot be measured by a conventional nonscanning confocal image acquisition apparatus because of blind regions. Microscanning the image of the slit array can also reduce the effect of speckles, another problem of a conventional nonscanning confocal image acquisition apparatus, by averaging the reflected light passing through each aperture of the slit array.

4 Claims, 9 Drawing Sheets

SLIT APERTURE OF ILLUMINATING
LIGHT UNIT

MICRO-SCANNING MULTISLIT CONFOCAL IMAGE ACQUISITION APPARATUS

BACKGROUND OF THE INVENTION

1. Field of the Invention

The present invention relates to the configuration of an image acquisition apparatus for measuring the shape of the surface of an object utilizing a two-dimensional array type confocal optical system.

2. Description of the Background

Figure 8:
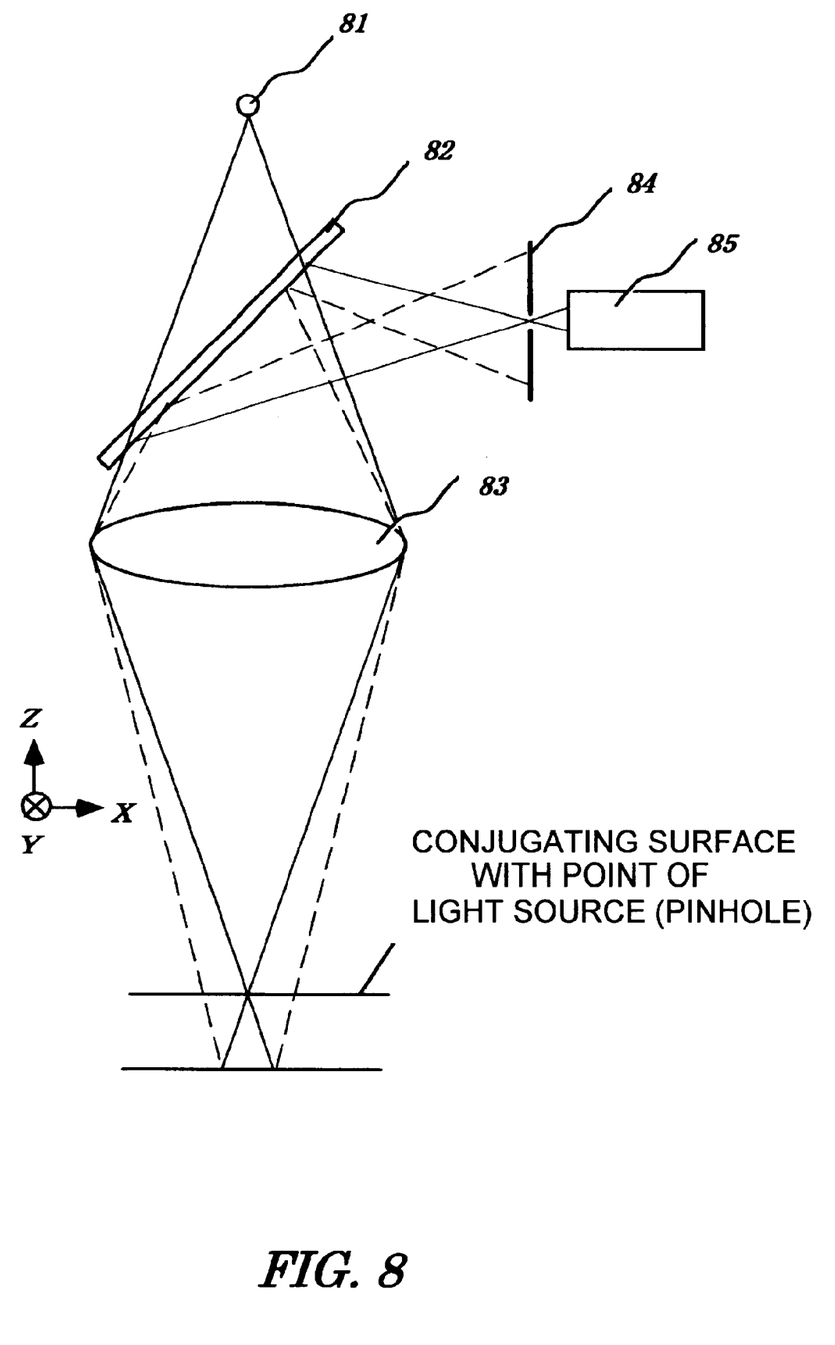
FIG. 8 is a schematic drawing for explaining the principle of a confocal optical system.

The position (hereinafter referred to as the height) of the object measured in the direction of the optical axis (hereinafter referred to as the z-axis direction) can be measured accurately by utilizing a confocal optical system. Before description of the prior art, the principle of measurement of height by a confocal optical system is explained. A basic configuration of the confocal optical system is shown in FIG. 8. Light emitted from a point light source 81 passes through a half-mirror 82 and is refracted by an objective lens 83 so as to converge onto the object. The light that is reflected by the object reenters the objective lens 83 and is caused to converge by the objective lens 83 and then diverted by the half-mirror 82 toward a pinhole 84 disposed at the same position optically as the point light source 81. The amount of light that passes through the pinhole 84 is detected by a photodetector 85. This is the basic configuration of the confocal optical system. By using this optical system, the height of points on the surface of the object can be measured in the following manner. If the surface of the object that reflects the light is located at a position conjugate to the point light source 81, the reflected light focuses at the position of the pinhole 84. Therefore, almost all the light diverted by the half-mirror 82 passes through the pinhole 84. As the surface that reflects light for illumination is at a greater distance away from the position conjugate to the point light source, the amount of light that passes through the pinhole 84 sharply decreases. This makes it possible to calculate the height of the surface by moving the objective lens 83 and determining the position where the output of the photodetector 85 becomes a maximum. This is the principle of measurement of height by a confocal optical system.

A confocal optical system of the above basic configuration can measure only one point on the surface of the object. For three-dimensional shape measurement, two-dimensional measurement of an appropriate horizontal area is required. To obtain two-dimensional confocal data (hereinafter referred to as confocal images), a confocal image acquisition apparatus utilizing the above confocal optical system must have a scanning means or a plurality of confocal optical systems disposed in parallel. A typical image acquisition apparatus of the latter is a two-dimensional array type image acquisition apparatus. A two-dimensional array type image acquisition system has a feature that can capture a whole two-dimensional image at one time thereby making very fast measurement possible. A two-dimensional array type image acquisition apparatus is disclosed in the specification of Japanese patent application No. 94682/1996. This apparatus is described below with reference to FIG. 7 as a representative example of a two-dimensional array type image acquisition apparatus.

Figure 7:
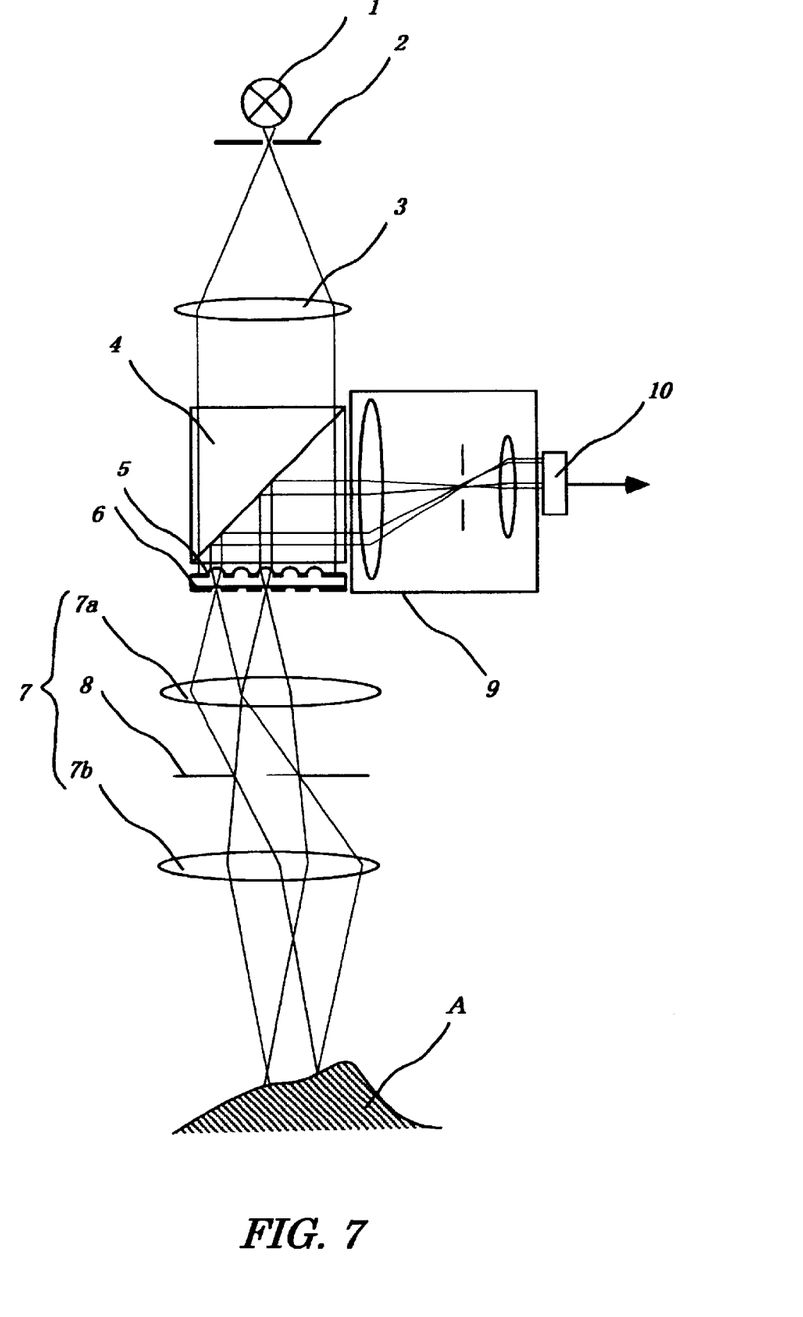
FIG. 7 is a conventional two-dimensional array type confocal optical system.

Light for illumination that is emitted from a light source 1 passes through an illuminating pinhole 2 and is refracted by an illuminating lens 3 into parallel rays of light, then enters a beam splitter 4. The light that passes through the beam splitter 4 falls upon a microlens array 5 and is caused to converge by individual lenses of the microlens array 5 to form a very small spot at their focal points. A pinhole array 6 is placed at the position of the focal plane of the microlens array 5. The pinhole array 6 is aligned with the microlens array 5 so that each pinhole of the pinhole array 6 is centered on the optical axis of the corresponding lens of the microlens array 5 at the focal point. Therefore, almost all the illumination light that passes through the lenses of the microlens array 5 passes through the pinholes of the pinhole array 6. The pinholes of the pinhole array 6 are equivalent to point light sources arrayed in parallel. The illumination light that passes through the pinhole array 6 is caused to converge by a bidirectional telecentric objective lens 7 consisting of lenses 7a and 7b and a diaphragm 8 to form an image of the pinhole array 6 (a large number of arrayed small spots) on the surface of an object A. The light that is reflected from each spot on the surface of the object enters the objective lens 7 and is caused to converge by the objective lens 7 toward the corresponding pinhole of the pinhole array 6. The pinholes of the pinhole array 6 also perform the same function as the pinhole in front of the photodetector of the above described basic single-point confocal optical system. If the surface of the object A is on the focal plane of the pinhole array 6, the light reflected from the spots on the surface is focused just at the corresponding pinholes of the pinhole array 6, and the greatest amount of light passes through the pinholes. As the surface of the object A is away from the focal plane of the pinhole array 6, the amount of light that passes through the pinholes sharply decreases. The reflected light that passes through each pinhole of the pinhole array 6 is refracted by the corresponding microlens of the microlens array 5 into a parallel-ray light beam. The light beams are then diverted by the beam splitter 4 and pass through an image re-forming lens 9 to form a reduced image of the microlens array 5 on a two-dimensional arrayed photodetector 10. The two-dimensional arrayed photodetector 10 detects the intensity of individual light beams and outputs an electric signal proportional to the intensity.

By this configuration, it is possible to capture all points of a confocal image simultaneously. Therefore, the shape of the surface of an object can be measured by changing the distance between the objective lens and the object to capture confocal images at different Z positions and to find the position where the intensity of the pixel is greatest for each pixel.

A two-dimensional array type image acquisition apparatus is suited for industrial use because of its high measurement speed enabled by simultaneous focusing of all points to be measured, having no moving parts, and a high-speed shutter camera usable for the photodetector.

However, a two-dimensional array type image acquisition apparatus has a problem of speckles. Since a confocal imaging system is basically a coherent imaging system and illumination light shone on the surface of the object has a high coherency within each spot, the light reflected from each spot interferes to cause speckles in and around the corresponding pinhole of the pinhole array if there are inequalities in the surface within the spot area. Such speckles have a very bad effect on height measurement.

A solution to this problem is disclosed in the specification of Japanese patent application No. 55485/1997. The invention solves the problem by moving illumination spots in a small back and forth scanning motion (vibration) that does not overlap the scanning motion of the adjacent spots during each exposure time of the two-dimensional arrayed photodetector in one complete measurement, utilizing the fact that adjacent spots are seperated by a distance several times the diameter of the spots in a two-dimensional array type confocal image acquisition apparatus. If inequalities in the surface are random, the scanning motion of the spots causes speckles to flicker randomly and averages the intensity of the reflected light passing through the pinholes.

There is another problem in addition to the problem of speckles. Since there is a comparatively large space between adjacent illumination spots, the information about the regions on the surface between spots is not obtained. An image of an object captured by a combination of an ordinary image-forming optical system and a two-dimensional arrayed photodetector such as a CCD camera contains information on almost the whole surface of the object, since there is only a very small space between adjacent pixels. Each pixel of an image represents the total amount of light reflected from the corresponding region of the surface, though averaged over the region. Therefore, even a projection smaller than a pixel (bright spot) can be detected. On the other hand, a two-dimensional array type confocal image acquisition apparatus cannot measure such a projection if it is located between illumination spots.

Figure 9:
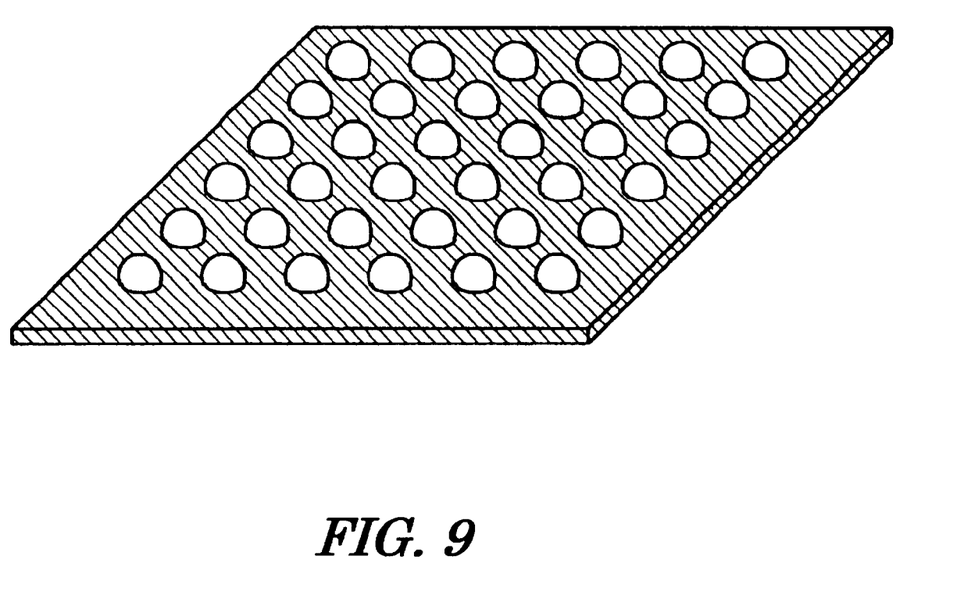
FIG. 9 is a schematic drawing for explaining BGA and CSP.

This problem is described below using a concrete example. A package for a semiconductor chip called a BGA (Ball Grid Array) or a CSP (Chip Scale Package) is used. This package has ball-shaped electrodes arrayed on a plane as shown in FIG. 9. It has suddenly come into wide use in recent years because of the small mounting area required for the number of electrodes. It is important for this package that the tops of all balls are aligned at the same height. Therefore, the inspection apparatus must accurately measure the height of the tops of the balls. Since the balls have a near-mirror surface, only the light reflected from the top part of the balls returns to the objective lens if the balls are illuminated from directly above. The size of the top part that reflects the light returning to the objective lens varies depending on the diameter of the balls and the NA of the objective lens. It decreases to a size smaller than a pixel as the diameter of the balls becomes smaller. An image acquisition apparatus using an ordinary image-forming optical system and a two-dimensional arrayed photodetector such as a CCD camera can measure even the top part of the balls smaller than a pixel, though not accurately. On the other hand, a two-dimensional array type confocal image acquisition apparatus cannot measure this unless an illumination spot is directed onto it.

In brief, a conventional two-dimensional array type confocal image acquisition apparatus has a problem inasmuch as it cannot measure a small object because of blind regions between illumination spots.

In addition to the above problem that a small object cannot be measured, blind regions between illumination spots cause another problem. Subpixel-accuracy edge measurement, commonly possible when performing measurement of the edges of objects in images by image processing, is not possible by image processing of images obtained by a two-dimensional array type confocal image acquisition apparatus because of blind regions between illumination spots, or a low aperture ratio for pixels resulting from blind regions.

SUMMARY OF THE INVENTION

The object of the present invention is to provide a non-scanning confocal image acquisition apparatus for measuring the shape of the surface of an object which apparatus does not have blind regions between illumination spots and can significantly reduce the effect of speckles.

The present invention attains the above object by a scanning multislit confocal image acquisition apparatus comprising:

a nonscanning multislit confocal image acquisition system that comprises a slit array consisting of a plurality of two-dimensionally arrayed slit apertures, an objective lens that focuses illumination light passing through the slit array from behind so as to form an image of the slit array on the surface of the object to be measured and also converges the light reflected from the surface of the object onto the slit array, and a two-dimensional arrayed photodetector for detecting the amount of light that passes through each slit aperture of a slit array disposed at the same optical position as the slit array, instead of a conventional multispot confocal image acquisition system, and a multislit-image micro-scanning mechanism for moving the image of the slit array in a small back-and-forth motion with respect to the object during each exposure of the two-dimensional arrayed photodetector in one complete measurement.

In a more specific configuration, the non-scanning multislit confocal image acquisition system comprises:

an illuminating light source in the shape of a slit;

an illuminating lens refracting the light emitted from each point of the slit-shaped light source into parallel rays;

an upper microlens array consisting of a plurality of two-dimensionally arrayed microlenses, each microlense converging the light passing through the illuminating lens to form an image of the slit-shaped light source;

a lower microlens array consisting of a plurality of two-dimensionally arrayed microlenses, each microlense having the same focal length as the microlenses of the upper microlens array and centered on the optical axis of the corresponding microlenses of the upper microlens array at the focal point;

a slit array consisting of a plurality of two-dimensionally arrayed slit apertures disposed at the same position as the corresponding microlenses of the lower microlens array so as to allow the image of the slit-shaped light source formed by the corresponding microlenses of the upper microlens array to pass through;

an objective lens forming the image of the slit array onto the surface of the object to be measured;

a beam splitter diverting the light reflected by the surface of the object and converged by the objective lens onto the slit array so that it passes through the slit array, lower microlens array, and upper microlens array away from the illuminating light source;

a two-dimensional arrayed photodetector detecting the amount of light that passes through each slit aperture of the slit array; and an image re-forming lens disposed between the beam splitter and the two-dimensional arrayed photodetector so that an image of the upper microlens array is properly formed on the two-dimensional arrayed photodetector.

The multislit-image microscanning mechanism comprises a transparent plane parallel plate disposed between the objective lens and the object to be measured and a means for changing the tilt angle of the plane parallel plate with the optical axis.

A galvanometer scanner can be used as the means for changing the tilt angle of the plane parallel plate with the optical axis.

Other objects, features and advantages of the invention will hereinafter become more readily apparent from the following description.

DETAILED DESCRIPTION OF THE INVENTION AND PREFERRED EMBODIMENT

Figure 1:
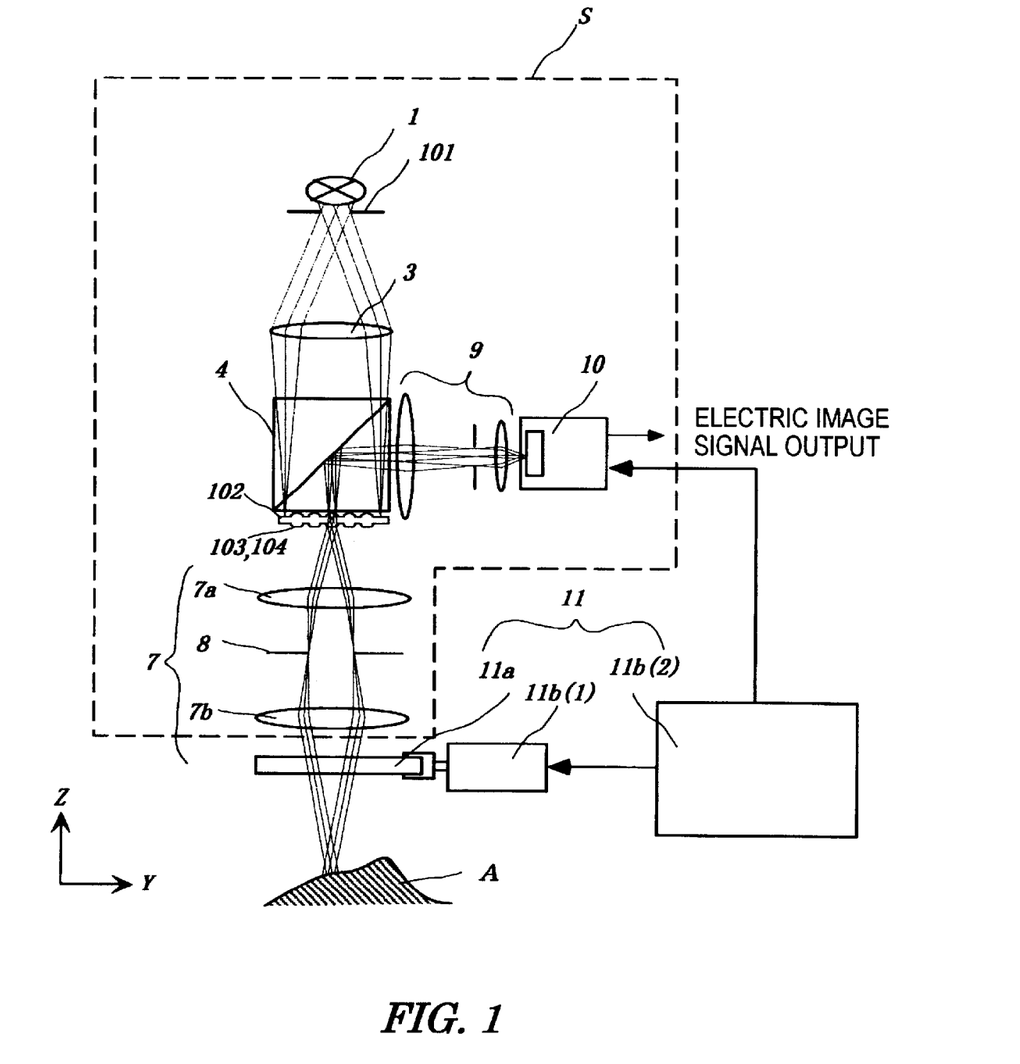
FIG. 1 is a side view of a first embodiment of the nonscanning multislit image acquisition apparatus of the present invention along a YZ plane.
Figure 2:
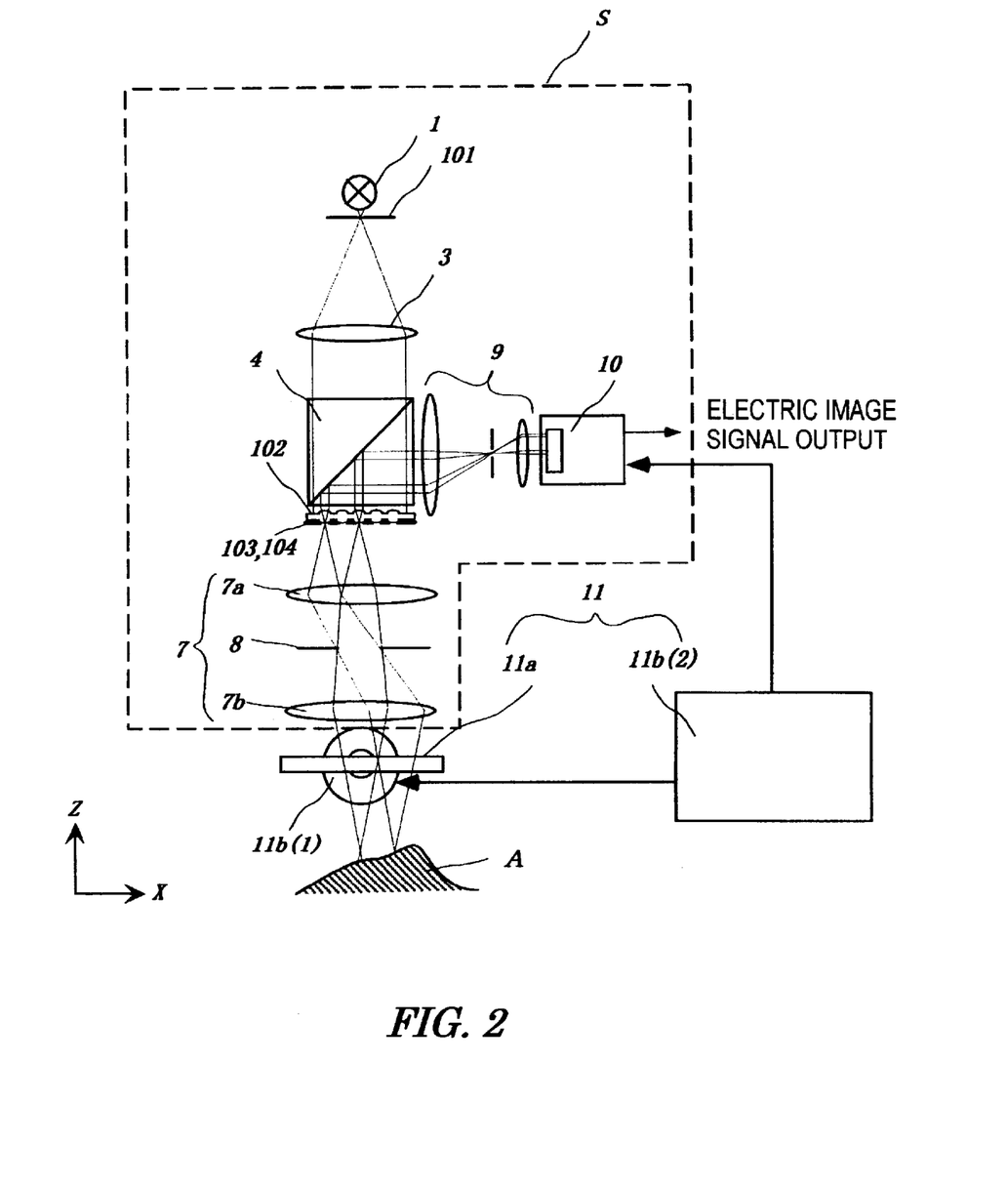
FIG. 2 is a side view of the first embodiment of the present invention along an XZ plane.

Preferred embodiments of the present invention are described below with reference to the drawings. FIGS. 1 and 2 show a first embodiment of the present invention. FIGS. 1 and 2 are side views of the first embodiment viewed from two directions at right angles to each other, in which some parts (a beam splitter 4, image re-forming lens 9, two-dimensional arrayed photodetector 10, object A, and controller 11b (2)) are drawn from the same direction in order to make the drawings easy to understand.

The apparatus of the present invention comprises a nonscanning multislit confocal image acquisition system S and a multislit-image microscanning mechanism 11. First, the nonscanning multislit confocal image acquisition system S is described below.

Figure 3:
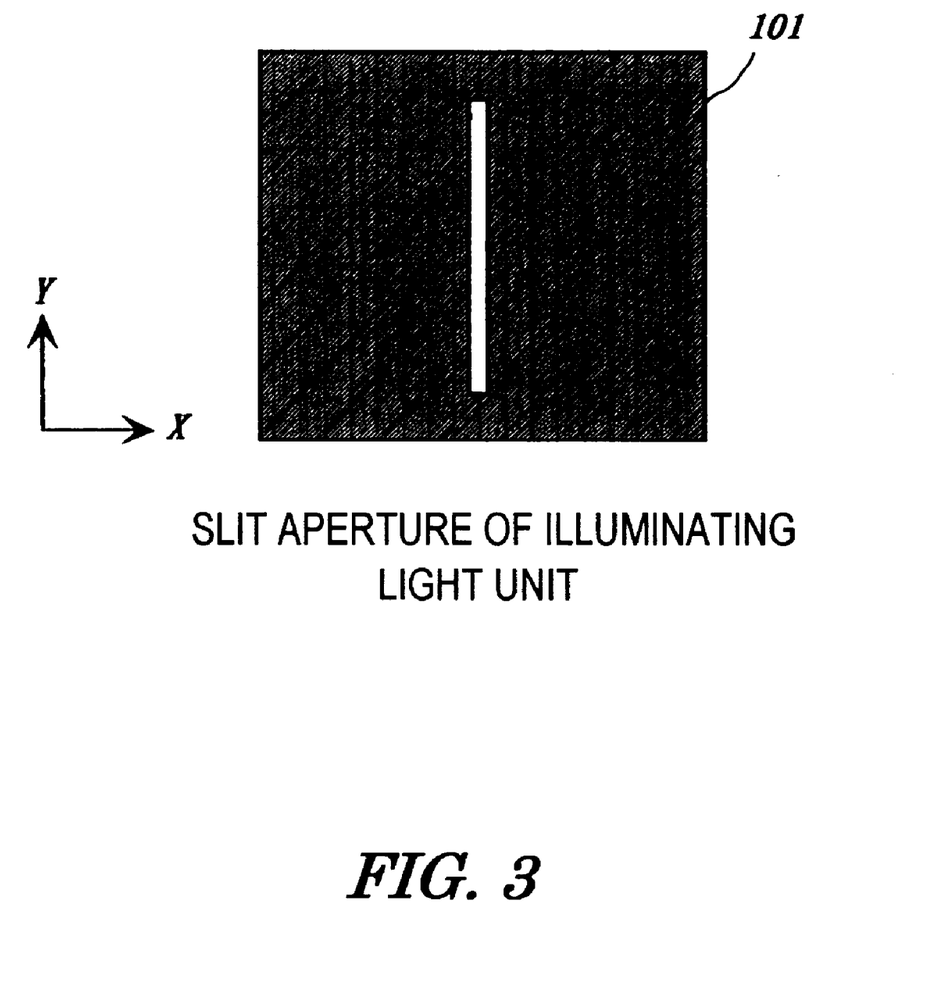
FIG. 3 shows the slit aperture of the illuminating light unit of the first embodiment.
Figure 4:
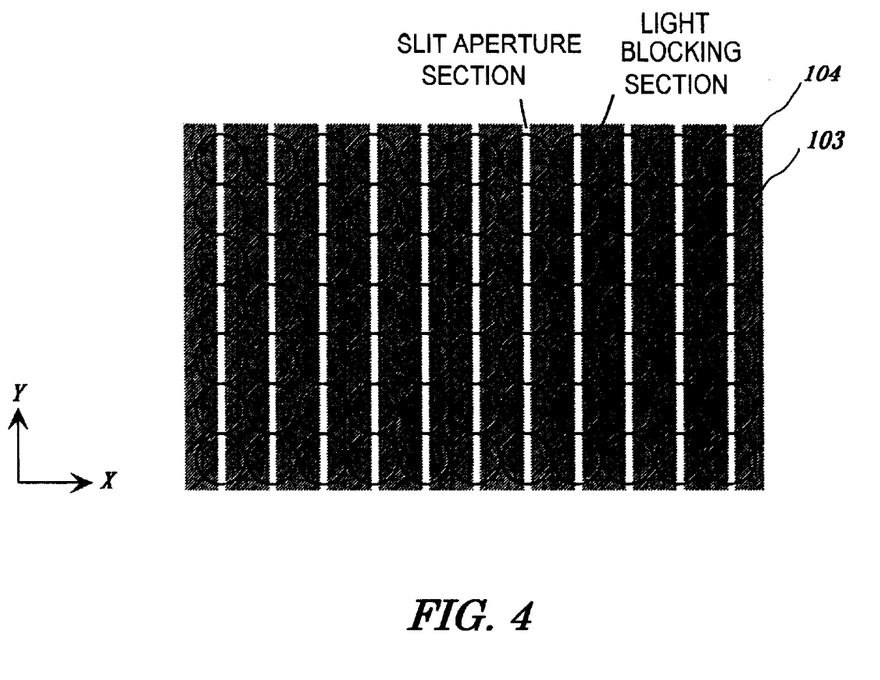
FIG. 4 shows the lower microlens array and slit array of the first embodiment.

A light source 1 and a slit aperture 101 compose the illuminating light unit that emits light from the whole slit aperture 101 uniformly. Specifically, for example, the slit aperture 101 is formed by bundling one end of optical fibers in the shape of a slit, and the other end of the optical fibers is bundled in the shape of a circle, into which light from a halogen lamp used for the light source 1 is introduced by means of a lens and a reflecting mirror. Other embodiments may also be used as long as the aperture for emitting light is in the shape of a slit and the light source is such that light emitted from each point in the slit aperture is a spherical wave. The illuminating light unit can be simply embodied by illuminating a diffusing plate in the shape of a slit from behind. The light source 1 may be a monochromatic lamp or wideband white lamp. A laser is not preferable because of high coherency, still it can be used satisfactorily by adding a phase randomizer such as a rotating diffusing plate. The slit aperture 101 is shown in FIG. 3. The direction along the long side of the slit aperture 101 is designated as the Y direction and the direction along the short side as the X direction as shown in FIG. 3. The X and Y directions are also used in other Figures in the description below.

Light emitted from the illuminating light unit enters an illuminating lens 3. The illuminating lens 3 and the slit aperture 101 are disposed so that the slit aperture 101 is at the focal point of the illuminating lens 3. Therefore, spherical-wave light emitted from each point in the slit aperture is refracted by the illuminating lens 3 into plane-wave light, which then passes through a beam splitter 4 and uniformly illuminates an upper microlens array 102. The thus-disposed illuminating lens 3 and the slit aperture 101 make up a simplified Koehler illuminating system. This illuminating system has a large numerical aperture (hereinafter abbreviated to NA) in the Y direction along the large side of the slit aperture 101 as shown in FIG. 1, but a very small NA, almost parallel-ray, in the X direction as shown in FIG. 2.

Figure 5:
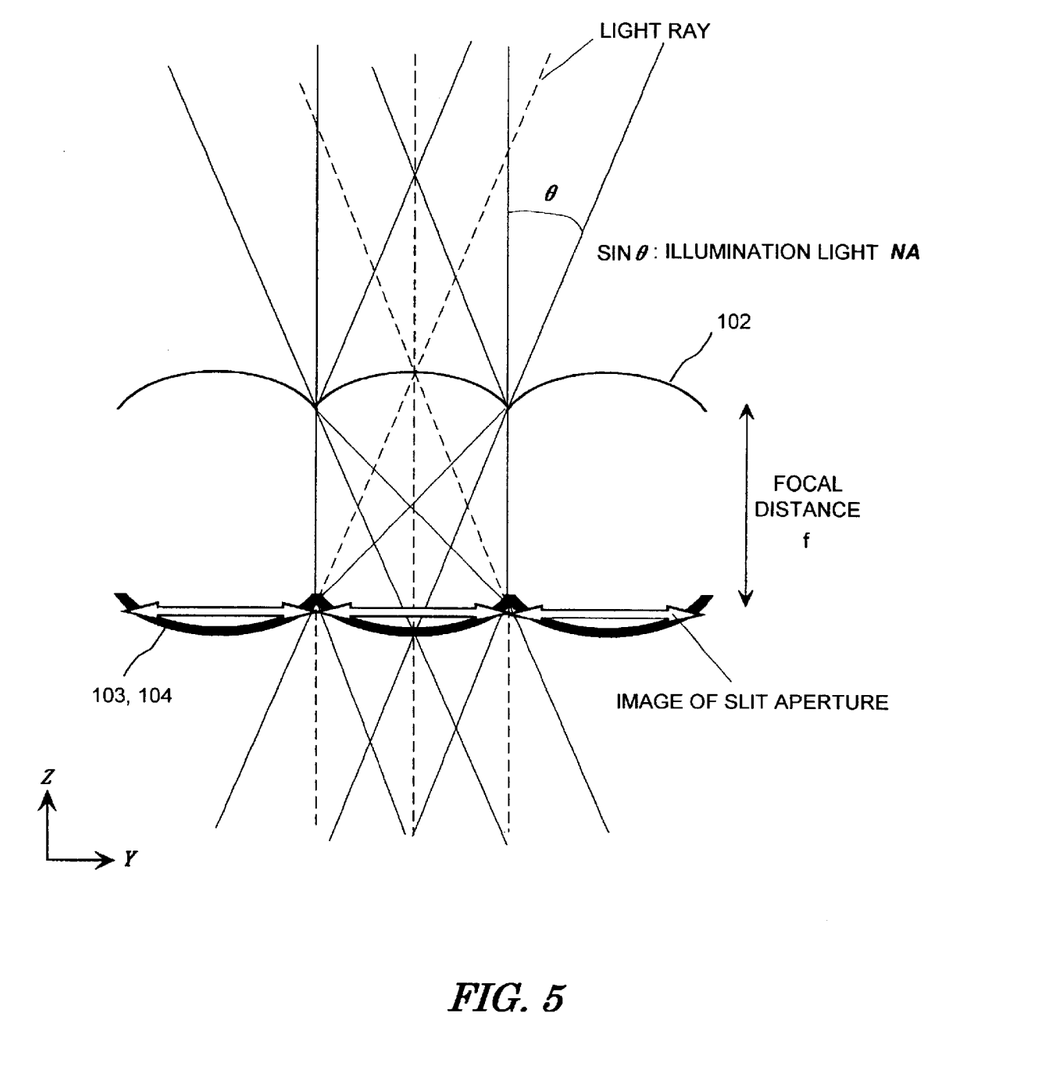
FIG. 5 shows the rays of light that pass through the upper and lower microlens arrays and slit array in the first embodiment.

The light that falls over the upper microlens array 102 is caused to converge by each microlens to form an image of the slit aperture 101 on the corresponding microlens of a lower microlens array 103 which is disposed so that its microlenses are coaxially positioned at the focal point of their corresponding microlenses of the upper microlens array 102. The detailed configuration of this part is shown in FIG. 5. The length of the slit aperture 101 is determined so that the length of its image formed on microlenses of the lower microlens array 103 is the same as the diameter of the microlenses. When the focal length of the illuminating lens 3 is 200 mm and the diameter and focal length of the microlenses are 100 μm and 1 mm, for example, the image-forming magnification is 1/200 and hence the length of the slit is calculated to be 20 mm by 100 μm multiplied by 200.

An image of the slit aperture 101 is thus formed on each microlens of the lower microlens array 103. A slit 104 is formed on the surface of each microlens of the lower microlens array 104 so that it allows the image of the slit aperture 101 to pass through. The slits collectively are referred to as the slit array 104. These slits are fabricated, for example, by coating the surface of the microlenses with a three-layer coat (i.e., light blocking coat) consisting of chromic oxide, chromium, and chromic oxide and etching the coat in the shape of the slit.

The illumination light that forms an image of the slit aperture 101 on each microlens of the lower microlens array 103 passes through the corresponding slit of the slit array 104 and is directed straight downward by refraction of the lower microlens.

A more detailed description is given below with reference to FIG. 5. Illumination light emitted from a point in the slit aperture 101 as a spherical wave is refracted into a plane wave by the illuminating lens 3. After passing through the beam splitter 4, the light enters each microlens of the upper microlens array 102 in parallel or obliquely to the optical axis of the microlens according to the point in the slit aperture 101 from which the light is emitted. The light that enters each microlens in a plane wave is converged into a very small point at different positions on the focal plane of the microlens according to the angle of incidence. An image of the slit aperture 101 is thus formed on each microlens of the lower microlens array 103. Since each microlens performs the function of a diaphragm, the chief rays of each microlens are the rays that pass the center of each microlens (shown in a broken line in FIG. 5). Since the microlenses of the upper and lower microlens arrays 102 and 103 have the same focal length, the light rays passing the center of each microlens of the upper microlens array 102 are light rays passing the focus of the corresponding microlens of the lower microlens array 103. Therefore, the light passing the center of each microlens of the upper microlens array 102 becomes parallel-ray light after it passes through the microlenses of the lower microlens array 103. In other words, the bundle of rays that forms each point constituting an image of the slit aperture 101 on each microlens of the lower microlens array 103 is directed by the microlens straight downward (to the objective lens) in a spherical wave.

The light that passes through the slits of the slit array 104 then passes through a bidirectional telecentric objective lens consisting of a lens 7a, diaphragm 8, and lens 7b and forms an image of the slit array 104, or a plurality of images of the slit aperture 101, on the surface of the object A.

The light that is reflected on the object A and enters the objective lens 7 is caused to converge by the objective lens 7 to focus on or near the corresponding slit of the slit array 104.

The light that passes through each slit of the slit array 104 then passes through the corresponding microlens of the lower microlens array 103 and that of the upper microlens array 102 and is emitted in a plane wave in parallel or obliquely to the optical axis of each microlens of the upper microlens array 102 according to the point in the corresponding slit image on the surface of the object from which the light is reflected. The light that is emitted from the upper microlens array 102 is diverted by the beam splitter 4 to the two-dimensional arrayed photodetector 10. The diverted light passes through an image re-forming lens 9 and forms an image of the upper microlens array 104 on a two-dimensional arrayed photodetector which outputs electric image signals through photo-electric transduction.

The image re-forming lens 9 is disposed so as to form an image of the upper microlens array 102 on the two-dimensional arrayed photodetector 10 in the same manner as that of a conventional two-dimensional array type confocal optical system. Since the microlens array 102 is made so that adjacent microlenses are in direct contact without a space, the distribution of the intensity of light over the two-dimensional arrayed photodetector 10 is fundamentally smooth and hence no special alignment of the elements of the two-dimensional arrayed photodetector 10 with the slits or microlenses is required.

The configuration and principle of the part from the microlens array 102 to the two-dimensional arrayed photodetector 10 are the same as that of a conventional two-dimensional array type confocal optical system.

To put it briefly, this nonscanning multislit confocal image acquisition system has a so called slit confocal configuration that uses a slit array instead of a pinhole array for a conventional two-dimensional array type confocal optical system. The slit confocal configuration has almost the same features as the pinhole confocal configuration, though the resolution is a little lower in the direction of the long side of the slit. Therefore, the nonscanning multislit image acquisition system can be used for measurement of the shape of the surface of an object as well as a conventional two-dimensional array confocal optical system.

For the two-dimensional arrayed photodetector 10, an ordinary CCD sensor (or CCD camera) can be used. Not only a CCD sensor but also a MOS sensor, vidicon, or other two-dimensional arrayed photodetector can be used. A one-dimensional arrayed photodetector (line sensor) may be used when only one-dimensional information is required.

For the beam splitter 4, a polarizing beam splitter is preferable in order to prevent the light reflected by the top surface of the microlens arrays 102 and 103 and the light-blocking coat of the slit array 104 from reaching the two-dimensional arrayed photodetector 10. When using a polarizing beam splitter, it is preferable to dispose a ¼-wave plate in or above or below the objective lens 7.

Further, this apparatus can also be used as a fluorescent microscope by using a dichroic prism for the beam splitter 4 and a ultraviolet lamp for the light source 1.

Next, the multislit-image microscanning mechanism 11 is described with reference to FIG. 1. A transparent plane parallel plate of optical glass 11a is disposed between the objective lens 7b and the object A. The plane parallel plate 11a is attached to the galvanometer scanner 11b(1). The angle of tilt of the plane parallel plate 11a is controlled by the controller 11b(2).

Figure 6:
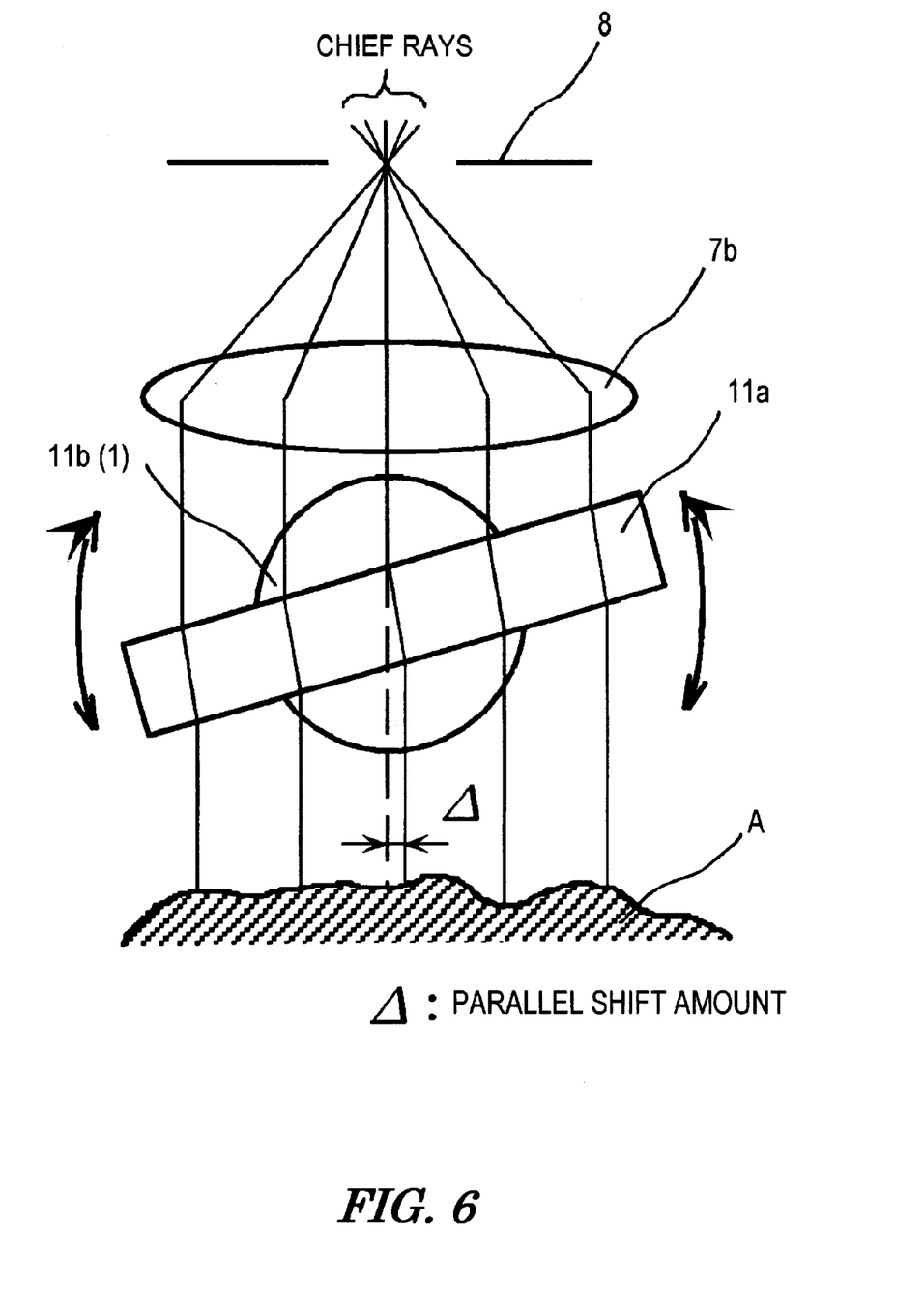
FIG. 6 shows the multislit-image microscanning mechanism of the first embodiment.

The operation of this mechanism is described with reference to FIG. 6. Since the objective lens 7 (only the lens 7b is shown in FIG. 6) is a bidirectional telecentric lens, the chief rays that pass through the lens 7b become parallel in the object space. When the plane parallel plate 11a disposed between the objective lens 7b and the object A is tilted as shown in FIG. 6, the chief rays are shifted a very small distance Δ in the horizontal direction according to the angle of tilt. This shift of the chief rays causes the same shift of the whole image of the slit array 104 on the surface of the object A. By using this principle, the image of the slit array is moved in a small back and forth scanning motion with respect to the object A by changing the tilt angle of the plane parallel plate 11a by the galvanometer scanner 11b(1).

This microscanning motion is performed within an area of one pixel (equal to the distance between adjacent slits) to avoid decreasing the resolution. In a multibeam confocal optical system, adjacent illumination spots or slits must be spaced at least five times the diameter or width of the illumination spots as described above. If the space is not large enough, a multibeam confocal optical system becomes similar to an ordinary optical system and hence measurement is impossible. By utilizing the fact that there are surface regions not illuminated by illumination light (blind regions) to scan illumination spots over those blind regions within the exposure time of the two-dimensional arrayed photodetector 10 for capturing an image at different heights, it becomes possible to smooth speckles without decreasing the resolution and the speed of image acquisition. It is explained in the discussion of the background that the invention of smoothing of speckles by scanning illumination spots for a conventional multispot confocal optical system was made by the inventor of the present invention. The present invention provides a multislit confocal image acquisition apparatus with the same speckle smoothing capability.

By the above-described configuration, speckles are significantly smoothed as in the scanning multispot confocal optical system. Further, unlike the scanning multispot confocal optical system, blind regions can be reduced completely by moving each slit image a long distance in the Y direction and back and forth in the X direction within an amplitude equal to the radius of the microlenses of the microlens arrays.

A combination of a plane parallel transparent plate and a galvanometer scanner is used for the multislit-image microscanning mechanism 11 in this embodiment. However, since the essence of the present invention is to move slits formed by illumination light in a small back and forth scanning motion with respect to the object, the multislit-image microscanning mechanism 11 may be embodied by other various forms. For an example, the same effect can be obtained by bending the optical path in the shape of a crank at the position of the telecentric diaphragm of the objective lens and swinging one of the mirrors for bending the optical path by a galvanometer scanner. Further, the same effect can also be obtained by vibrating the object or an optical system by means of a piezoelectric element.

As described above, two major problems of a nonscanning multi-spot image acquisition apparatus, that is to say, blind regions and speckles, are solved by the scanning multislit image acquisition apparatus of the present invention. As a result, more accurate measurement of the shape of the surface of an object without the effect of blind regions and speckles becomes possible. Further, measurement of the height of an object whose light-reflecting surface is smaller than a pixel, for example, the height of the top of very small spherical objects, also becomes possible.

Obviously, numerous modifications and variations of the present invention are possible in light of the above teachings. It is therefore to be understood that, within the scope of the appended claims, the invention may be practiced otherwise than as specifically described herein.

What is claimed is:

1. A micro-scanning multislit confocal image acquisition apparatus comprising:

a nonscanning multislit confocal image acquisition system that uses a slit array consisting of a plurality of two-dimensionally arrayed slit apertures, an objective lens that causes illumination light passing through said slit array from behind to converge so as to form an image of said slit array on the surface of the object measured and also causes the light reflected from the surface of the object to converge toward said slit array, and a two-dimensional arrayed photodetector for detecting the amount of light that passes through each slit aperture of a slit array disposed at the same position optically as said slit array and a multislit-image microscanning mechanism for moving the image of said slit array in a small back and forth motion with respect to the object during each exposure of said two-dimensional arrayed photodetector in one complete measurement.

2. The micro-scanning multislit confocal image acquisition apparatus of claim 1 wherein said nonscanning multislit confocal image acquisition system comprises:

an illuminating light source in the shape of a slit;

an illuminating lens refracting the light emitted from each point of said slit-shaped light source into parallel rays;

an upper microlens array consisting of a plurality of two-dimensionally arrayed microlenses, each microlense converging the light passing through said illuminating lens to form an image of said slit-shaped light source;

a lower microlens array consisting of a plurality of two-dimensionally arrayed microlenses, each microlense having the same focal length as the microlenses of said upper microlens array and centered on the optical axis of the corresponding microlenses of the upper microlens array at the focal point;

a slit array consisting of a plurality of two-dimensionally arrayed slit apertures, disposed at the same position as the corresponding microlenses of said lower microlens array so as to allow the image of said slit-shaped light source formed by the corresponding microlenses of the upper microlens array to pass through;

an objective lens forming the image of said slit array onto the surface of the object measured;

a beam splitter diverting the light reflected by the surface of the object and converged by said objective lens onto said slit array so that it then passes through said slit array, lower microlens array, and upper microlens array away from said illuminating light source;

a two-dimensional arrayed photodetector detecting the amount of light that reaches each element; and an image re-forming lens disposed between said beam splitter and said two-dimensional arrayed photodetector so that an image of said upper microlens array is properly formed on said two-dimensional arrayed photodetector.

3. The micro-scanning multislit confocal image acquisition apparatus of claim 1 wherein said multislit-image microscanning mechanism comprises a transparent plane parallel plate disposed between said objective lens and the object and a means for changing the tilt angle of said plane parallel plate with the optical axis.

4. The micro-scanning multislit confocal image acquisition apparatus of claim 3 wherein said means for changing the tilt angle of said plane parallel plate is a galvanometer scanner.

* * * * *